United States Patent [19]

Ujihara et al.

[11] Patent Number: 4,970,911
[45] Date of Patent: Nov. 20, 1990

[54] POWER DEVICE OF WINDOW REGULATOR

[75] Inventors: Hiroshi Ujihara; Akihiro Takeda, both of Yokohama, Japan

[73] Assignee: Ohi Seisakusho Co., Ltd., Yokohama, Japan

[21] Appl. No.: 189,331

[22] Filed: May 2, 1988

[30] Foreign Application Priority Data

May 1, 1987 [JP] Japan .............................. 62-65287[U]

[51] Int. Cl.⁵ .............................................. E05F 11/48
[52] U.S. Cl. ............................. 74/501.5 R; 403/361; 403/4; 49/352
[58] Field of Search ............ 74/501.5 R, 89.22, 500.5; 403/383, 361, 4; 49/352

[56] References Cited

U.S. PATENT DOCUMENTS

| | | | |
|---|---|---|---|
| 1,989,083 | 1/1935 | Danken | 403/361 X |
| 2,406,553 | 8/1946 | Mader | 403/383 X |
| 3,222,951 | 12/1965 | Maursey | 74/558.5 X |
| 4,110,935 | 9/1978 | Sessa | 49/352 |
| 4,577,439 | 3/1986 | Seki | 74/89.22 X |

FOREIGN PATENT DOCUMENTS 60-80676 5/1985 Japan .
2029502 3/1980 United Kingdom ................. 49/352

Primary Examiner—Gary L. Smith
Assistant Examiner—F. Saether
Attorney, Agent, or Firm—Foley & Lardner, Schwartz, Jeffery, Schwaab, Mack, Blumenthal & Evans

[57] ABSTRACT

A power device for a window regulator is disclosed. The window regulator is of a type which regulates a window pane by moving pull-up and pull-down drive cables connected to the window pane. The power device comprises a motor-powered driving part which includes an output shaft which has a regular polygonal cross section; and a cable winder part including a drum about which the pull-up and pull-down drive cables are wound, the drum having a coupling bore to which the output shaft is engaged, the coupling bore having a regular polygonal star-like cross section with equally spaced angular recesses. The number of the equally spaced angular recesses of the coupling bore is integral times as many as that of the angles of the polygonally cross-sectioned output shaft.

13 Claims, 5 Drawing Sheets

POWER DEVICE OF WINDOW REGULATOR

BACKGROUND OF THE INVENTION

1. Field of the Invention

The present invention relates in general to window regulators of a motor vehicle, and more particularly to power devices, for the window regulators, of a type which drives pull-up and pull-down drive cables for regulating a window pane.

2. Description of the Prior Art

In power devices of the above-mentioned type, there has been employed an arrangement wherein a motor-powered driving part and a cable winder part are detachably connected, so that the motor-powered driving part can be applied to various types of cable winder parts.

In order to clarify the task of the present invention, one conventional power device of the above-mentioned type will be described with reference to FIGS. 5 and 6, which is disclosed in Japanese Patent First Provisional Publication No. 60-80676.

Referring to FIG. 5, motor-powered driving part is shown, which comprises an electric motor A, a speed reduction gear B and an output shaft C. The speed reduction gear B includes a worm which is driven by a drive shaft of the motor A and a worm wheel which is meshed with the worm and drives the output shaft C. The output shaft C has at its exposed end portion three engaging pawls $C_1$, $C_2$ and $C_3$ which are arranged about the axis of the shaft C at equally spaced intervals of 120°.

Referring to FIG. 6, a cable winder part is shown, which comprises a drum D for winding thereon pull-up and pull-down drive cables of a window pane. Designated by numeral $D_3$ is a shaft bore formed in the center of the drum D. The drum D has a spirally turned groove $D_1$ formed thereabout for neatly winding thereon the pull-up and pull-down drive cables. Designated by numerals $D_2$ and $D_2$ are catching cuts which are provided at axially opposed circular portions of the drum D for retaining respective ends of the drive cables. One of the axially opposed circular portions of the drum D is formed with a depressed pattern which comprises an annular groove $D_4$ coaxially extending about the shaft bore $D_3$ and three radially extending recesses $E_1$, $E_2$ and $E_3$ arranged on the annular groove $D_4$ at equally spaced intervals of 120°.

Upon assembly, the engaging pawls $C_1$, $C_2$ and $C_3$ of the output shaft C are brought into a meshing engagement with the three recesses $E_1$, $E_2$ and $E_3$ of the drum D to achieve a driving connection between the driving part and the cable winder part.

However, due to its inherent construction, the above-mentioned power device has the following drawbacks which are encountered during assembly procedure of the window regulator.

That is, for assembling the window regulator, the pull-up and pull-down drive cables are fixed at their outward ends to a carrier plate of the window pane which runs upward and downward along a vertically extending guide rail secured to a vehicle door, then the two drive cables are put around upper and lower guide pulleys arranged at upper and lower ends of the guide rail, and then the inward portions of the drive cables are wound around the drum D having the inward ends of the cables retained to the cuts $D_2$ and $D_2$ of the drum D. Thereafter, the motor-powered driving part is mounted to the cable winder part which has been thus subassembled. This means that the mounting of the motor-powered driving part to the cable winder part should be made after the cable winder part is fixed to a so-called window pane carrying device. However, this process induces that an assembler must carry out the mounting awkwardly without checking the connection manner of them with his eyes. As is known, this mounting procedure method is difficult or at least troublesome.

In fact, the proper coupling between the output shaft C and the drum D should be made by turning, in a severe case, the drum D by 60° in either direction. However, after fitting the cable winder part to the window panel carrying part, the turning of the drum D can not be easily achieved because of a considerable resistance by the drive cables. Thus, the mating of the two parts sets the assembler a very difficult work.

SUMMARY OF THE INVENTION

It is thus an object of the present invention to provide a power device of a window regulator, which is free of the above-mentioned drawbacks.

According to the present invention, there is provided a power device of a window regulator, which comprises a motor-powered driving part and a cable winder part which can be easily coupled.

According to the present invention, there is provided, in a window regulator for regulating a window pane by axially moving pull-up and pull-down drive cables connected to the window pane, an improved power device. The power device comprises a motor-powered driving part having an output shaft, the output shaft having a regular polygonal cross section; and a cable winder part having a drum about which the pull-up and pull-down drive cables are wound, the drum having a coupling bore to which the output shaft is engaged, the coupling bore having a regular polygonal star-like cross section with equally spaced angular recesses, wherein the number of the equally spaced angular recesses of the coupling bore is integral times as many as that of the angles of the polygonally cross-sectioned output shaft.

BRIEF DESCRIPTION OF THE DRAWINGS

Other objects and advantages of the present invention will be clarified from the following description when taken in conjunction with the accompanying drawings, in which.

DETAILED DESCRIPTION OF THE INVENTION

In the following, a power device according to the present invention will be described in detail with reference to FIGS. 1 to 4 of the accompanying drawings.

It is to be noted that in the following description, the terms "upward", "downward", "rightward", "leftward" and the like are to be understood with respect to the drawings on which the corresponding part is illustrated. It is to be noted that the right and left portions of FIG. 1 with respect to the illustrated window regulator show the inside and the outside of an associated motor vehicle.

Figure 1:
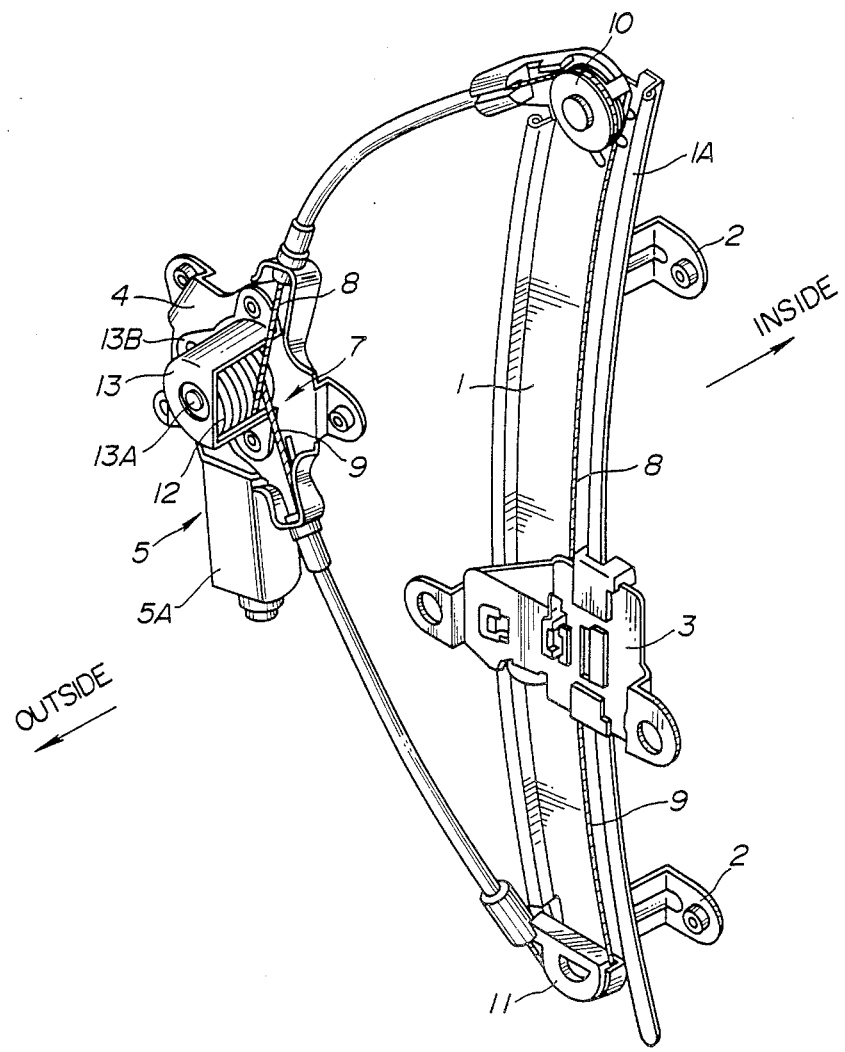
FIG. 1 is a perspective view of a window regulator to which a power device of the present invention is practically applied.

Referring to FIG. 1, there is shown a window regulator to which the power device of the present invention is practically applied. The window regulator shown in the drawing comprises a rail-plate 1 which extends in the substantially vertical direction and is secured through brackets 2 and 2 to a door panel (not shown). The rail-plate 1 is formed with a vertically extending guide rail 1A along which a carrier plate 3 for a window pane (not shown) slides. A guide pulley 10 is rotatably mounted to an upper end of the rail-plate 1, and a semicircular guide member 11 is secured to a lower end of the rail-plate 1.

Designated by numeral 4 is a base plate which is secured to the door panel (not shown). The base plate 4 has a considerable opening (not shown) formed therethrough.

The power device of the invention is mounted to the base plate 4, which comprises a motor-powered driving part 5 and a cable winder part 7 which are attached to opposed sides of the base plates 4 placing the opening of the base plate 4 therebetween. That is, as is seen from the drawing, the driving part 5 is attached to an inboard side of the base plate 4, while the cable winder part 7 is attached to an outboard side of the base plate 4.

Figure 4:
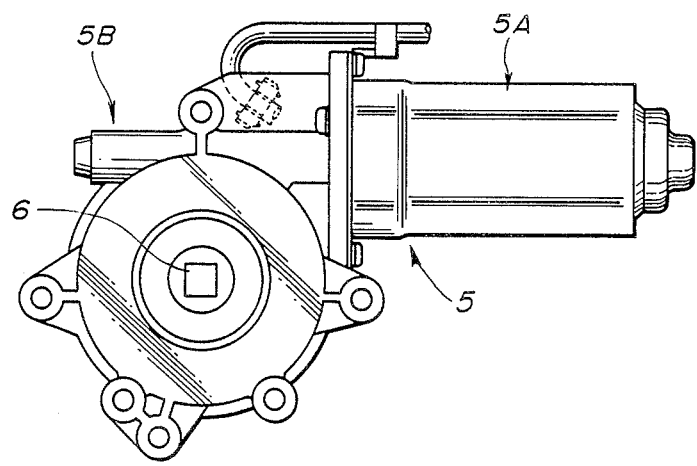
FIG. 4 is a plan view of a motor-powered driving part of the power device of the present invention.
Figure 5:
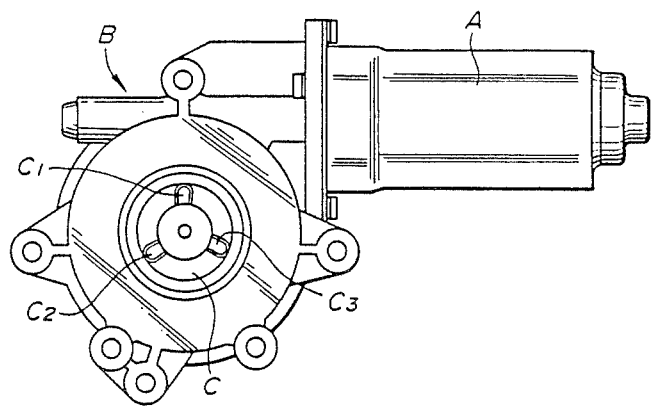
FIG. 5 is a plan view of a motor-powered driving part of a conventional power device.
Figure 6:
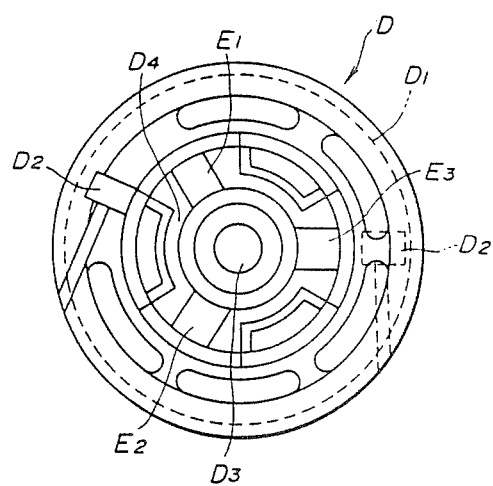
FIG. 6 is a plan view of a drum which is a part of a cable winder part of the conventional power device.
Figure 8:
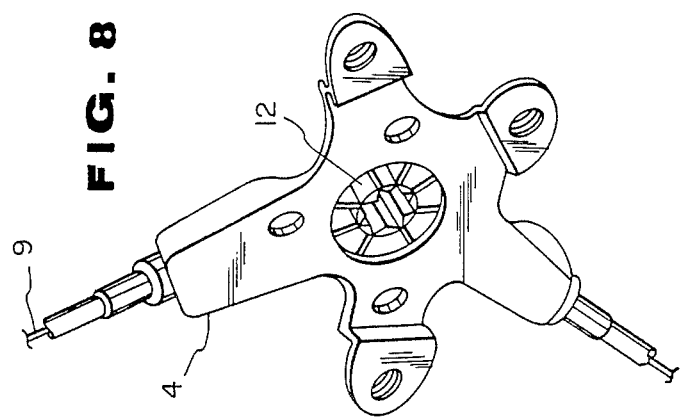
FIG. 8 is a view taken from the direction of the arrow VIII of FIG. 7 showing an aperture base plate.
Figure 7:
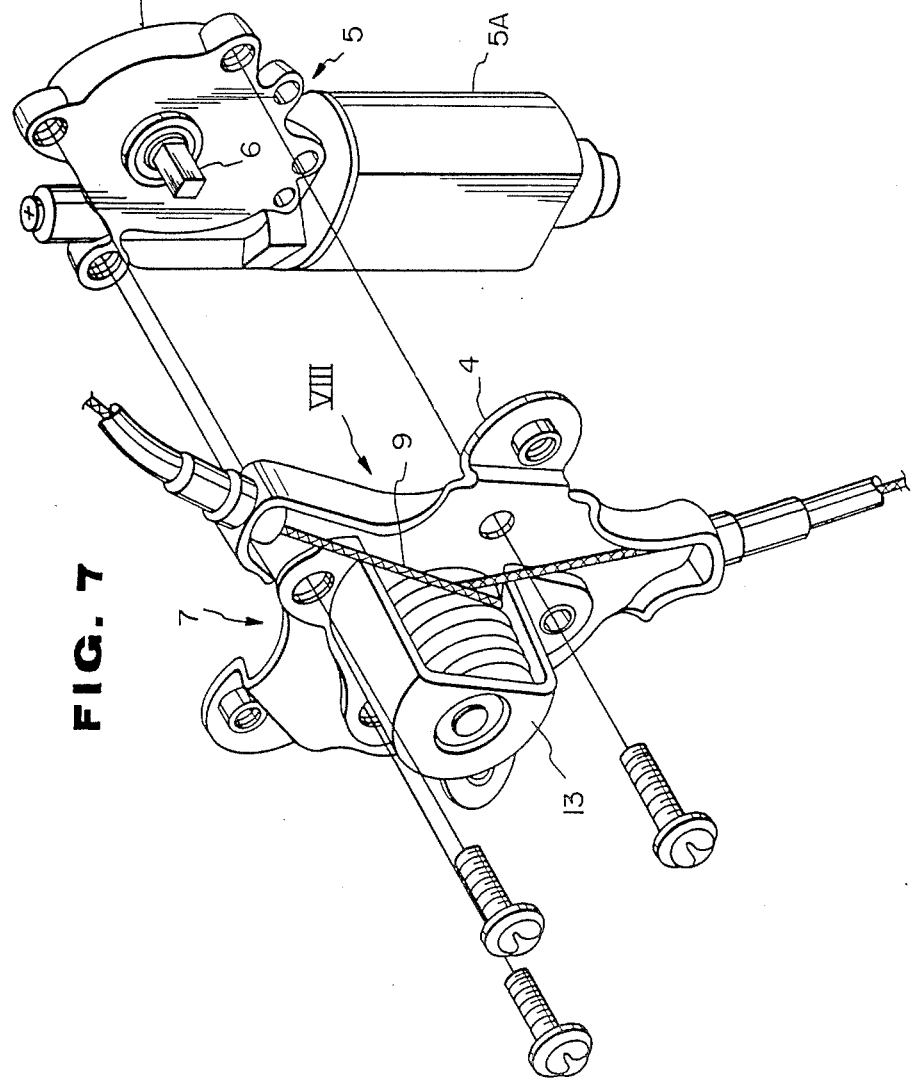
FIG. 7 is an exploded view of the power device showing a motor-powered driving part and a cable winder part.

The motor-powered driving part 5 comprises an electric motor 5A and a speed reduction gear 5B (see FIG. 4). The speed reduction gear 5B includes a worm which is driven by an output shaft of the motor 5A and a worm wheel which is meshed with the worm and drives an output shaft 6. The output shaft 6 is coupled with an after-described input section of the cable winder part 7 for driving the latter.

For the reason which will be clarified hereinafter, the output shaft 6 is shaped to have a square cross section.

As is seen from FIG. 1, two, for example, pull-up and pull-down cables 8 and 9 extend from the cable winder part 7 toward the carrier plate 3. That is, the pull-up cable 8 is put around the guide pulley 10 having its leading end fixed to a middle portion of the carrier plate 3, while the pull-down cable 9 is put around the guide member 11 having its leading end fixed to the middle portion of the carrier plate 3.

The cable winder part 7 comprises a drum 12, a short shaft 13A for rotatably holding the drum 12, and a semicylindrical casing 13 for housing therein the drum 12. That is, the short shaft 13A is installed in the casing 13 having one end secured to a circular wall of the casing 13. The drum 12 has a spirally turned groove 12A formed thereabout for neatly winding thereon the pull-up and pull-down cables 8 and 9. The casing 13 has three mounting lugs 13B secured to the base plate 4.

The detailed construction of the drum 12 will be described in the following with reference to FIGS. 2 and 3.

The drum 12 has at its center a hub portion 12B from which evenly spaced ribs 12F extend to the cylindrical outer wall 12E of the drum 12. As is seen from FIG. 3, the hub portion 12B is formed at its right side with a concentric bore 12C into which the above-mentioned short shaft 13A is received. Thus, the drum 12 rotates about the shaft 13A in the casing 13. The hub portion 12B is further formed at its left side a concentric coupling bore 12D to which the output shaft 6 of the speed reduction gear 5B of the motor-powered driving part 5 is latchingly engaged. The coupling bore 12D is shaped to have a regular polygonal star-like cross section having eight equally spaced angular recesses $12D_1$, $12D_2$...$12D_8$. It is to be noted that every square recess defined by alternate four of the angular recesses $12D_1$, $12D_2$...$12D_8$ can match with the square end portion of the output shaft 6.

Figure 2:
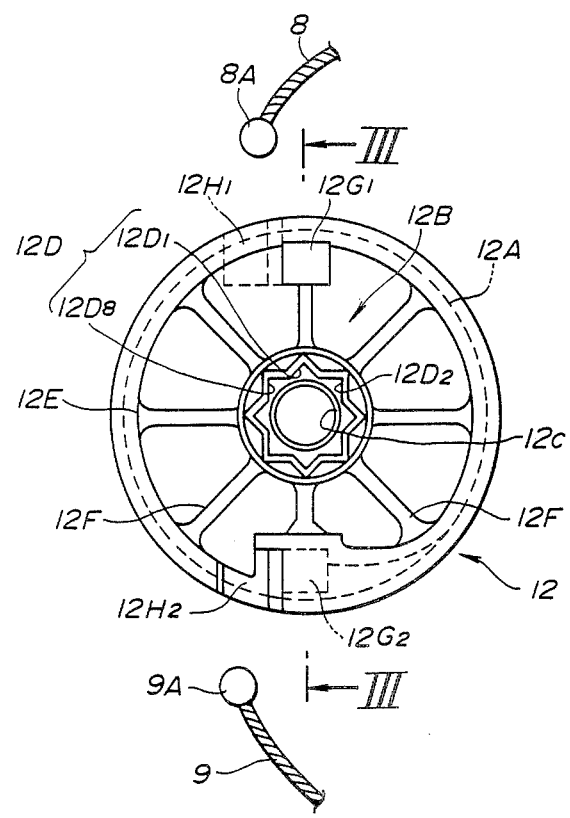
FIG. 2 is a plan view of a drum which is a part of a cable winder part of the power device of the present invention.
Figure 3:
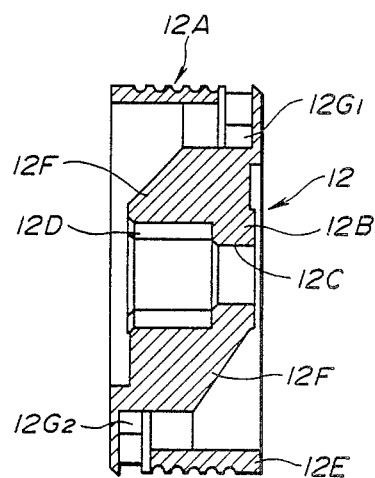
FIG. 3 is a sectional view taken along the line III—III of FIG. 2.

As is seen from FIGS. 2 and 3, the drum 12 is formed at its diametrically opposed portions with respective catching cuts $12G_1$ and $12G_2$ to which inward ends of the pull-up and pull-down drive cables 8 and 9 are connected through respective fixing pieces 8A and 9A. Near the catching cuts $12G_1$ and $12G_2$, there are formed guide grooves $12H_1$ and $12H_2$ for guiding the threading of the cables 8 and 9.

Similar to the case of the afore-mentioned conventional power device, the mounting of the motor-powered driving part 5 to the cable winder part 7 is made after the cable winder part 7 is tightly fixed to a so-called window pane carrying part, that is, after the drum-contained casing 13 is secured to the base plate 4.

Because the output shaft 6 has the square cross section and the coupling bore 12D of the drum 12 has the polygonal star-like cross section with eight angular recesses, the matching between the output shaft 6 and the coupling bore 12D is easily achieved by slightly turning the drum 12 about its axis. That is, the matching is assuredly carried out by turning the drum 12 by only 22.5° at the most. Thus, proper coupling between the output shaft 6 of the motor-powered driving part 5 and the drum 12 of the cable winder part 7 is instantly achieved.

Although the above-description is directed to an example wherein the output shaft 6 has a square cross section, the shaft 6 may have a pentagonal cross section. In this case, the coupling bore 12D of the drum 12 has a regular polygonal star-like cross section with ten angular recesses. In this modification, the matching between the output shaft and the coupling bore requires a turning of the drum by only 18° at the most. Thus, the assembling work becomes much more facilitated.

That is, in the invention, when the output shaft 6 has a regular polygonal cross section with "n" angles, the regular polygonal star-like cross section of the coupling bore 12D has "N" angular recesses, wherein "N" is integral times as many as "n". When this relation is satisfied, easy coupling between the output shaft 6 and the drum 12 is expected.

What is claimed is:

1. A power device for use in a window regulator which regulates a window pane by axially moving pull-up and pull-down cables connected to the window pane, the power device comprising:
    a first unit which comprises an electric motor having an output shaft,
    a speed reduction gear including a worm driven by said output shaft, a worm wheel which is meshed with said worm, and a power output shaft driven by said worm wheel, said power output shaft having a regular polygonal cross section;

a second unit which comprises a case, a shaft disposed in said case and a drum rotatably disposed about said shaft, said drum having said pull-up and pull-down cables wound thereabout and having a coupling bore to which said power output shaft is directly and operatively engaged, said coupling bore having a regular polygonal star-like cross section with equally spaced angular recesses, wherein the number of said equally spaced angular recesses of the coupling bore is integral times as many as that of the angles of the polygonally cross-sectioned output shaft in order to facilitate the coupling between said power shaft and said coupling bore upon coupling of said first and second units.

2. A power device as claimed in claim 1, in which the number of the angles of the output shaft is four and the number of said equally spaced angular recesses of the coupling bore is eight.

3. A power device as claimed in claim 1, in which the number of the angles of the output shaft is five and the number of said equally spaced angular recesses of the coupling bore is ten.

4. A power device as claimed in claim 1, in which said shaft which is installed in said case has one end secured to a wall of said case, said drum being rotatably supported by said shaft.

5. A power device as claimed in claim 4, in which said first unit and said second part are attached to opposed sides of an apertured base plate.

6. A power device as claimed in claim 5, in which the coupling between the output shaft and said coupling bore is made through the opening of the base plate.

7. A power device as claimed in claim 6, in which said case of the second unit has three mounting lugs secured to said base plate.

8. A power device in claimed in claim 4, in which said drum has at its diametrically opposed portions catching cuts to which inward ends of said pull-up and pull-down drive cables are connected.

9. A power device as claimed in claim 8, in which the inward end of each drive cable is equipped with a fixing piece for assuring the connection between the cable and the corresponding cut of the drum.

10. A power device as claimed in claim 9, in which said drum is further formed near said catching cuts with guide grooves for threading of the drive cables.

11. A power device as claimed in claim 10, in which said drum comprises an outer cylindrical wall, a hub portion and a plurality of ribs each extending from said hub portion to said outer cylindrical wall, said coupling bore being formed in said hub.

12. A power device as claimed in claim 11, in which said outer cylindrical wall has a spirally turned groove formed thereabout to wind thereon said pull-up and pull-down drive cables.

13. A power device for use in a window regulator which regulates a window pane by actually moving pull-up and pull-down cables connected to the window pane, the power device comprising:

a first unit which comprises an electric motor, and means for reducing the speed of said electric motor attached to said electric motor;

a second unit comprising a case, a shaft disposed in said case, a drum rotatably disposed about said shaft, said drum having said pull-up and pull-down cables wound thereabout;

first and second coupling means, said first coupling means including a power output shaft rotatably fixed and axially fixedly secured to said reduction means, said output shaft having a regular polygonal cross section, said second coupling means including a coupling bore in said drum, said coupling bore having a regular polygonal star-like cross section with equally spaced angular recesses;

wherein said first and second coupling means are directly and operatively engaged by said output shaft and said coupling bore performing an interlocking connection between said first and second unit, and the number of said equally spaced angular recesses of the coupling bore is integral times as many as that of the angles of polygonally cross section output shaft in order to facilitate the coupling between said power output shaft and said coupling bore upon coupling of said first and second units.

* * * * *